US005182171A

United States Patent [19]

Aoyama et al.

[11] Patent Number: 5,182,171

[45] Date of Patent: Jan. 26, 1993

[54] CONDUCTIVE AND CORROSION-RESISTANT STEEL SHEET

[75] Inventors: Yuji Aoyama; Katsutoshi Kumai, both of Funabashi, Japan

[73] Assignee: Taiyo Steel Co., Ltd., Tokyo, Japan

[21] Appl. No.: 393,949

[22] Filed: Jun. 16, 1989

Related U.S. Application Data

[63] Continuation of Ser. No. 65,512, Jun. 23, 1987, abandoned.

[30] Foreign Application Priority Data

Jun. 26, 1986 [JP] Japan ............................... 61-150595

[51] Int. Cl.[5] ............................................ B32B 15/04

[52] U.S. Cl. .................................... 428/623; 428/626; 428/659; 428/687; 428/336; 428/457

[58] Field of Search ............... 428/611, 623, 623, 626, 428/659, 687, 336, 457, 472, 472.1, 472.3

[56] References Cited

U.S. PATENT DOCUMENTS

| | | | |
|---|---|---|---|
| 4,496,401 | 1/1985 | Dawes et al. | 143/318 |
| 4,533,576 | 8/1985 | Tanahashi et al. | 428/336 |
| 4,643,951 | 2/1987 | Keem et al. | 428/472 |
| 4,775,599 | 10/1988 | Matsuoka et al. | 428/687 |
| 4,795,681 | 1/1989 | Furukawa et al. | 428/687 |
| 4,798,772 | 1/1989 | Furukawa | 428/687 |

FOREIGN PATENT DOCUMENTS

| | | | |
|---|---|---|---|
| 4476 | 2/1972 | Japan | 428/611 |
| 239991 | 10/1986 | Japan | 428/623 |

*Primary Examiner*—George Wyszomerski

*Attorney, Agent, or Firm*—Wenderoth, Lind & Ponack

[57] ABSTRACT

There is disclosed a conductive and corrosion resistant steel sheet comprising a steel sheet material having an arithmetic average roughness (Ra) of 0.01 to 2.0 μm, preferably, 0.2 to 1.5 μm, and a coating film applied thereon and having a dry thickness of 18 to 110%, preferably 30 to 90%, of said Ra.

15 Claims, 4 Drawing Sheets

CONDUCTIVE AND CORROSION-RESISTANT STEEL SHEET

This application is a continuation of now abandoned application, Ser. No. 07/065,512 filed on Jun. 23, 1987, abandoned.

BACKGROUND OF THE INVENTION

1. Field of the Invention

The present invention relates to a steel sheet for use in applications requiring electric conduction, such as grounding, supply of electricity or electric welding, which is endowed with both an electrical conductivity as one feature of a steel sheet and an excellent corrosion resistance, and specifically to a precoated steel sheet which is used as the casings of electric or electronic appliances and office automation appliances, and which is free of blocking in piling (shearing of plates to the required dimensions) or coiling and has a corrosion resistance, an electrical conductivity and an electromagnetic wave shielding effect.

2. Description of the Related Art

Steel sheets have many features and are used in a wide range of applications. Among such many features, electrical conductivity is one of the important features. Thus, steel sheets have many fields of utilization in grounding, supply of electricity, electric welding, etc. However, they always involve a problem of rusting.

The use of a steel sheet without any treatment for the purpose of securing electrical conductivity does not meet the requirement of corrosion resistance. The method of using a conductive coating (see, for example, Japanese Patent Laid-Open No. 189,843/1982) involves insufficiency of electric conductivity and high cost due to an expensive conductive coating. In a method of using other metal sheets such as an aluminum sheet instead of a steel sheet, the electrical conductivity of such a metal sheet is considerably poor as compared with that of a steel sheet, and other properties such as strength are also inferior.

There has recently arisen a problem that electromagnetic waves generated in an electric or electronic appliance or an office automation appliance bring about malfunction or noise generation of other electric or electronic appliance or office automation appliance (this phenomenon is called electromagnetic interference, hereinafter referred to briefly as EMI). This problem can be solved if the appliance is wholly covered with a conductive substance to ground the same. However, plastics as insulating substances and precoated steel sheets having insulating coatings formed on both sides thereof have recently been increasingly used particularly in casings of appliances, so that there has been an increasing demand for a countermeasure against the problem of EMI.

As for plastics, there has been proposed various methods as the EMI countermeasures including spray coating of a metal, vacuum evaporation and deposition of a metal, coating of the surface of a plastic with a paint containing a conductive pigment (see, for example, Japanese Patent Laid-Open No. 207,938/1984), and incorporation of a conductive substance into a plastic (see, for example, Japanese Patent Laid-Open No. 102,953/1984). However, any of these methods has disadvantages that the electrical conductivity is insufficient, a technical difficulty is involved, and the cost is increased.

As for precoated steel sheets, there have been proposed no particular EMI countermeasures as yet. Thus, a countermeasure is taken by leaving one side of a steel sheet untreated or subjecting the same to only chemical treatment or conversion coating, or by shaving off part of a coating from a precoated steel sheet. However, these methods involve a problem of a decrease in corrosion resistance in the exposed portion of the steel sheet. Particularly in the method of leaving one side of a steel sheet untreated or subjecting the same to only chemical treatment, there occurs, blocking, that is, injury of a decorative side (coated side) of a steel sheet by an untreated or chemically treated side thereof in piling or coiling. The method of shaving off part of a coating has a defect of an increase in the number of steps of manufacturing.

As the method of imparting an electrical conductivity to a precoated steel sheet, there has been proposed one in which a steel sheet is coated with a coating containing a metallic powder incorporated thereinto for imparting an electrical conductivity as described above. Also in this case, blocking is caused by the protruded portions of metal particles incorporated into the coating in piling or coiling just like the method of leaving one side of a steel sheet untreated or subjecting the same to only chemical treatment. Further, the electrical conductivity is insufficient for the EMI countermeasure.

SUMMARY OF THE INVENTION

An object of the present invention is to provide a steel sheet which enables the electrical conductivity of the steel sheet to be sufficiently utilized and has a sufficient corrosion resistance.

Another object of the present invention is to provide a precoated steel sheet which is free of blocking in piling or coiling, and has a corrosion resistance, an electrical conductivity and an electromagnetic wave shielding effect.

In accordance with the present invention there is provided a conductive and corrosion resistant steel sheet comprising a steel sheet material having an arithmetic average roughness (Ra) of 0.01 to 2.0 μm, preferably 0.2 to 1.5 μm, and a coating film applied thereon and having a dry thickness of 18 to 110%, preferably 30 to 90%, of said Ra. Preferably, a coating is used.

A chemical treatment or conversion treating is preferably applied between the coating and the steel sheet material.

Examples of the steel sheet material to be used in the present invention include cold-rolled sheet, hot galvanized sheet, electrogalvanized sheet, alloy-plated steel sheet, stainless steel sheet, and tin free steel sheet (TFS).

Since a chemical treatment with a chromate, zinc phosphate, or iron phosphate can improve the corrosion resistance of a steel sheet, such a treatment is preferably employed. The treatment with a chromate provides a smooth treated surface as compared with the treatment with zinc phosphate or iron phosphate. Therefore, where the coating film of the decorative side has a high gloss and hence is liable to cause blocking, the treatment with a chromate serves to improve the blocking resistance as compared with the treatment with zinc phosphate or iron phosphate.

The coating to be used is not particularly limited. Examples of the coating include melamine-alkyd, polyester, polyvinyliden fluoride, acrylic, silicone-polyester, epoxy, and urethane resins.

The coating may contain additives such as rust inhibiting or other pigments or a lubricant according to the purpose. The average particle size of a pigment or other additive is preferably 1 μm or smaller. When the average particle size is too large, there is a fear of causing blocking. Examples of the rust inhibiting pigments include those based on chrome. Examples of the other pigments include yellow iron oxide, red iron oxide, copper phthalocyanine blue, carbon black, and white titanium pigment. Polyethylene can be mentioned as the lubricant.

Particularly where the coating film of the decorative side has a high gloss and hence is liable to cause blocking, the use of a clear coating containing no pigment on the reverse side of a steel sheet is preferred since a smooth surface is obtained thereby. Thus, the gloss of the reverse side may be appropriately chosen depending on the gloss of the decorative side.

As described above, according to the present invention, the arithmetic average roughness (Ra) of the steel sheet material is 0.01 to 2.0 μm, preferably 0.2 to 1.5 μm. The Ra is measured according to JIS B 0601.

When the Ra of a steel sheet material exceeds 2.0 μm, a difficulty is encountered in improving the blocking resistance with a thin coating film according to the present invention because the unevenness of the surface of the steel sheet is too large. When the Ra of a steel sheet material is less than 0.01 μm, no sufficient electrical conductivity is obtained even with a thin coating film according to the present invention.

When the coating film of the decorative side has a high gloss and hence is liable to cause blocking, the Ra of a steel sheet material is more preferably 0.01 to 0.5 μm.

According to the present invention, the dry thickness of the coating film is 18 to 110%, preferably 30 to 90%, of the Ra of the steel sheet material. The dry film thickness is determined gravimetrically. When the dry film thickness is less than 18%, blocking cannot be eliminated and the corrosion resistance is insufficient. When it exceeds 110%, the electrical conductivity is insufficient.

According to the present invention, blocking is prevented and good corrosion resistance and electrical conductivity are secured by applying a coating having a dry film thickness ranging from 18 to 110%, preferably from 30 to 90%, of the Ra to a steel sheet material having an Ra of 0.1 to 2.0 μm, preferably 0.2 to 1.5 μm. In this regard, it is assumed that application of such a thin film provides partially exposed protruded portions of the surface of the steel sheet and these exposed portions allow an electric current to flow, thus providing a good electrical conductivity. It is further assumed that the recessed portions are covered with the coating so that the surface becomes considerably smooth and when the sheets are stacked in piling or coiling, the coating film has a buffering effect, so that unlike an untreated steel sheet surface or a merely chemically treated steel sheet surface, the coated surface does not injure the decorative side while the corrosion resistance of the steel sheet is improved.

DETAILED DESCRIPTION OF THE PREFERRED EMBODIMENTS

Examples of the present invention and Comparative Examples will now be described.

EXAMPLE 1

A hot galvanized sheet material having an amount of applied zinc of 120 g/m$^2$ was subjected to a chemical treatment with a chromate so that the amount of chromium applied was 30 mg/m$^2$. The steel sheet material thus prepared was coated with a solvent-based polyester coating having a solids content arbitrarily adjusted in a range of 1 to 20% according to the roll coating method.

Several kinds of hot galvanized sheet material having Ra of 0.2 μm, 0.4 μm, 0.7 μm, 1.1 μm, 1.5 μm, 2.0 μm and 2.3 μm (Comparative Example), respectively, were used.

Figure 1:
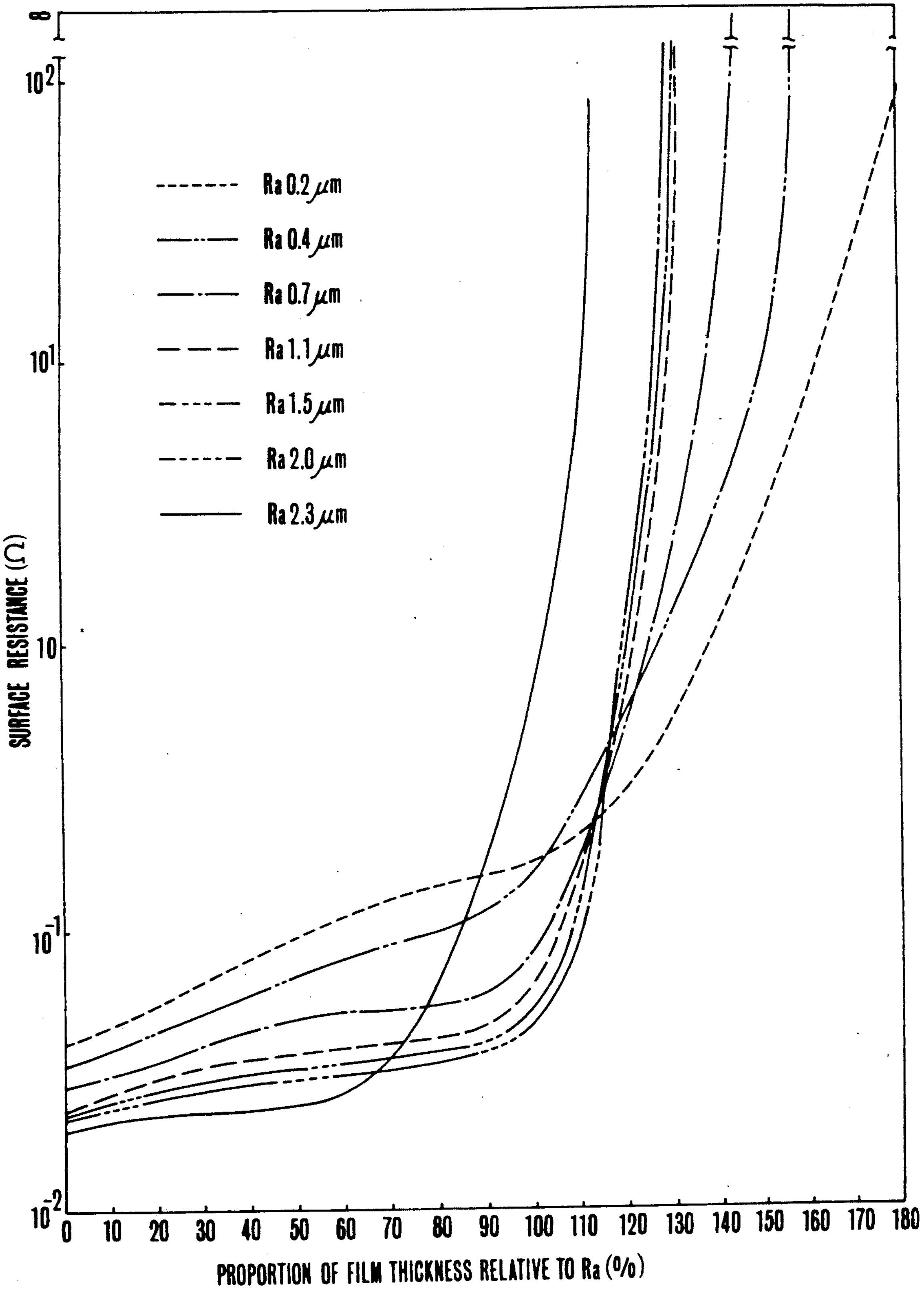
FIG. 1 is a graph showing a relationship between the proportion of the film thickness relative to the Ra of a steel sheet and the electric conductivity in Example 1.
Figure 2:
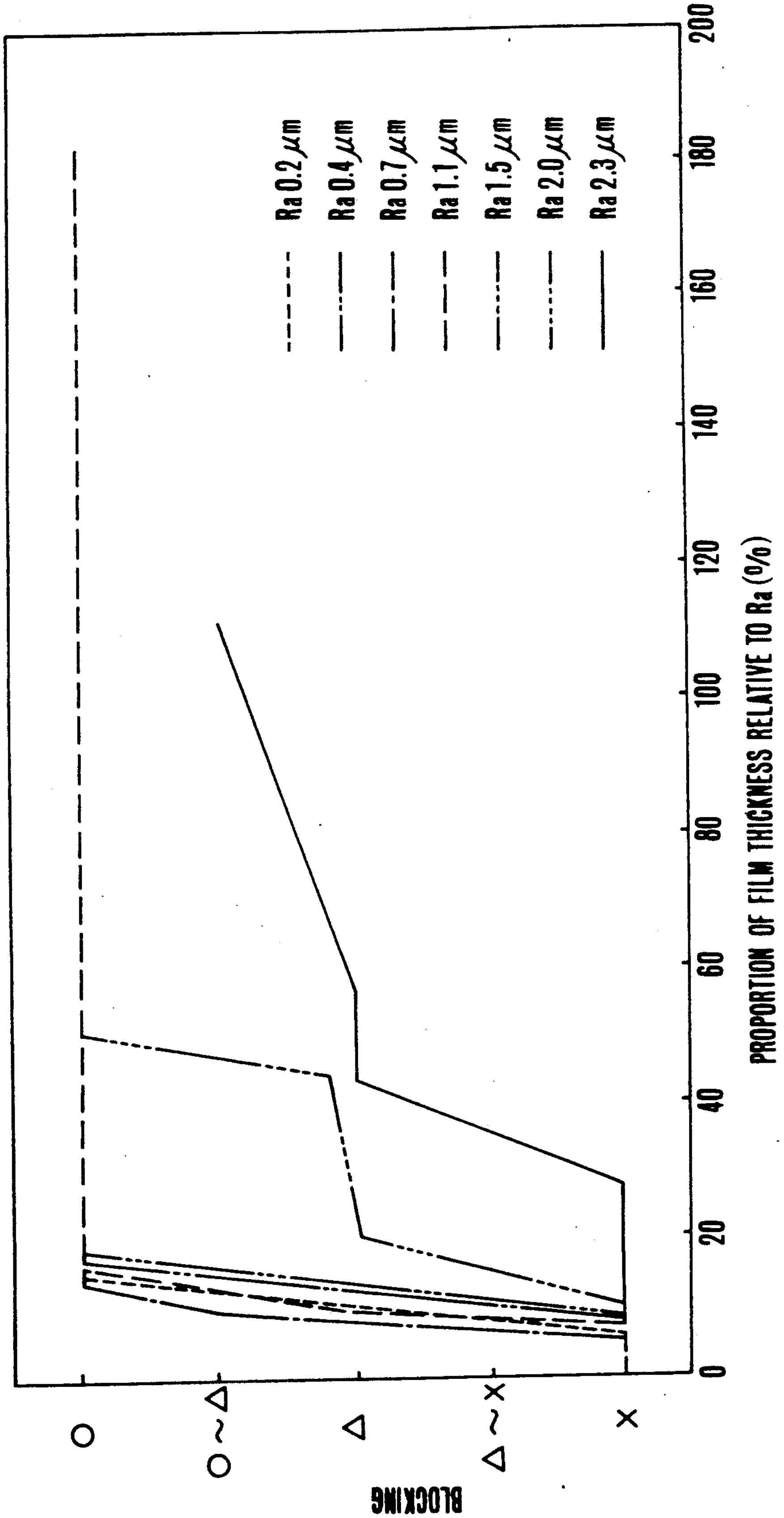
FIG. 2 is a graph showing a relationship between the proportion of the film thickness relative to the Ra of a steel sheet and the blocking property in Example 1.
Figure 3:
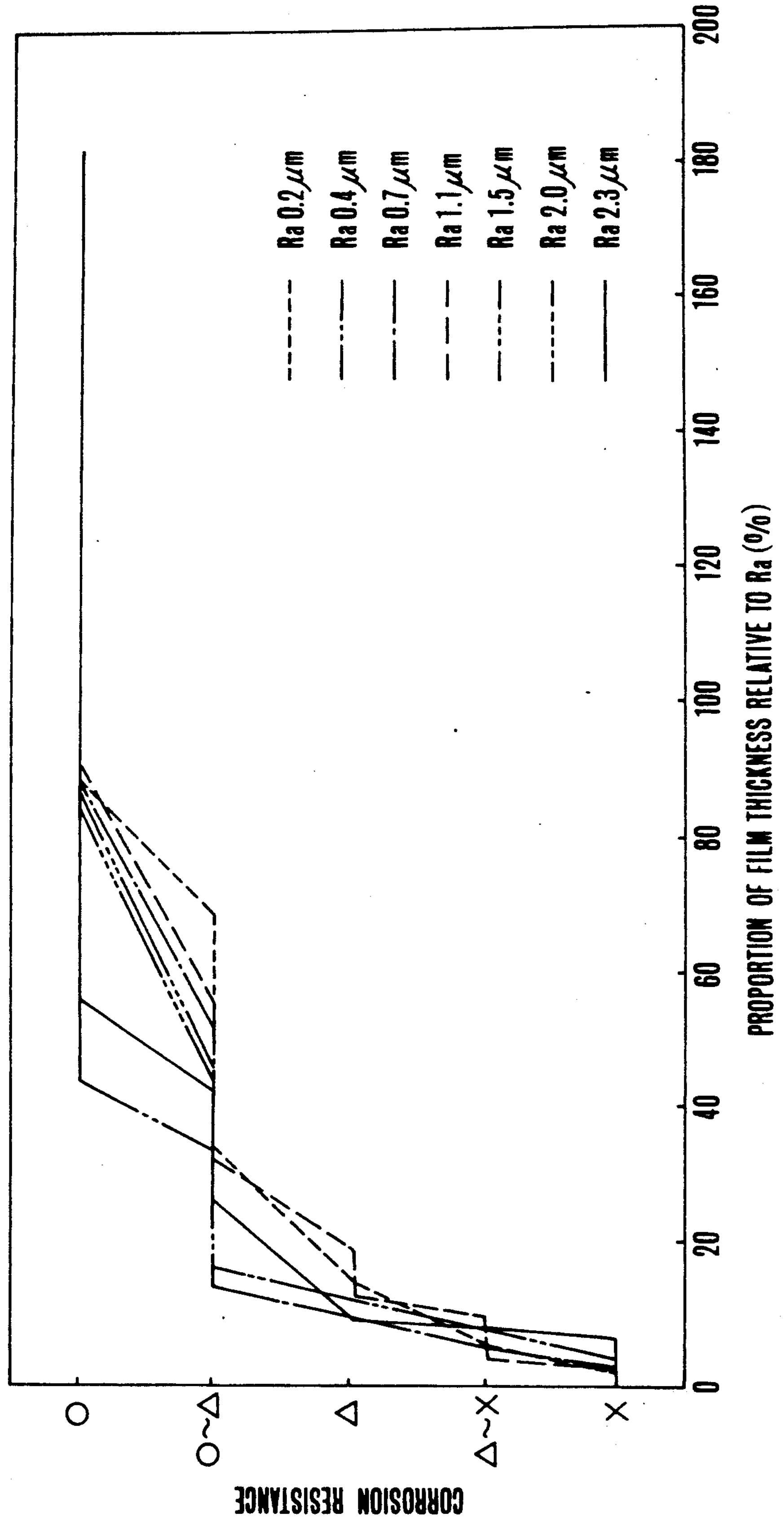
FIG. 3 is a graph showing a relationship between the proportion of the film thickness relative to the Ra of a steel sheet and the corrosion resistance in Example 1.

The results of measurement of electrical conductivity, blocking test and corrosion resistance test with varied film thicknesses of the coating under these conditions are shown in FIGS. 1, 2 and 3, respectively.

Figure 4:
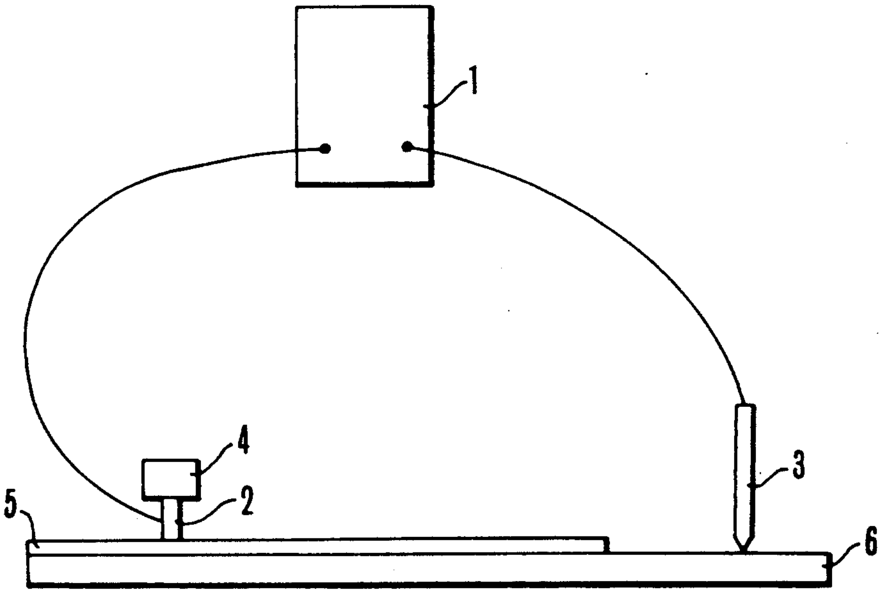
FIG. 4 is an illustrative diagram showing the method of measuring the electrical conductivity.

The measurement of the Ra of the steel sheet materials were conducted in accordance with JIS B 0601. The measurement of the coating film thickness was conducted gravimetrically. The measurement of electrical conductivity was conducted by the apparatus shown in FIG. 4. In FIG. 4, 1 indicates a micro resistance measuring meter, having four terminals (measuring range: 1 mΩ-100 Ω, full scale, 2 and 3 indicate contact pieces, 4 indicates a load (100 g), 5 indicates a coating film (the film may include two or more layers under the coating film in case where the chemical treatment is applied), and 6 indicates a steel plate material. The blocking test was conducted by stacking the test pieces prepared according to the above-mentioned process, with the test face and the decorative surface being put in face-to-face relation, applying a load of 100 kg/cm$^2$ thereon, allowing to stand in an atmosphere of 70° C. for one hour, and then evaluating the uneveness of gloss of the decorative surface. The decorative surfaces were prepared by a roll coater, using a silver metallic coating (specular gloss at 60° C.: 50%, dry film thickness: 20 μm) of a solvent-based polyester and a black coating (specular gloss at 60° C.: 70%, dry film thickness: 18 μm) of a solvent-based polyester. The ratings of blocking were as follows:

∘ no gloss unevenness is observed,
Δ slight gloss unevenness is observed, and
x notable gloss unevenness is observed.

The test of corrosion resistance was conducted by subjecting a test piece to salt spray exposure for 192 hours in accordance with JIS Z 2371 and evaluating the rate of appearance of white rust on the surface of the test piece. The ratings of corrosion resistance were as follows:

∘ the rate of appearance of white rust is less than 10%,
∘~Δ the rate of appearance of white rust is 10 to 33%,
Δ the rate of appearance of white rust is 33 to 50%, Δ~x the rate of appearance of white rust is 50 to 70%, and x the rate of appearance of white rust is more than 70%.

EXAMPLE 2

A hot galvanized sheet material (Ra: 0.7 μm) having an amount of applied zinc of 183 g/m² was subjected to a chemical treatment with a chromate so that the amount of chromium applied was 40 mg/m². The steel sheet material thus treated was coated with a solvent-based acrylic clear coating according to the roll coating method so that the dry film thickness was 0.5 μm.

COMPARATIVE EXAMPLE 1

The same chemically treated steel sheet material as that of Example 2 was coated with a solvent-based acrylic coating containing 10 wt. % of nickel conductive powder (particle size: 15 μm) incorporated thereinto according to the roll coating method so that the dry film thickness was 3 μm.

COMPARATIVE EXAMPLE 2

The same chemically treated steel sheet material as that of Example 2 was coated with a solvent-based acrylic coating containing 10 wt. % of carbon conductive powder (particle size: 0.1 μm) incorporated thereinto according to the roll coating method so that the dry film thickness was 3 μm.

The results of a measurement of electrical conductivity, blocking test, and corrosion resistance test as to Example 2 and Comparative Examples 1 and 2 are shown in Table 1. The test conditions, the method of evaluation and the method of measurement were the same as those of Example 1.

TABLE 1

| | Ex. 2 | Comp. Ex. 1 | Comp. Ex. 2 |
|---|---|---|---|
| Surface resistance | 83 | $5 \times 10^{3}$* | $3 \times 10^{4}$* |
| Blocking | ○ | x | ○~Δ |
| Corrosion resistance | ○ | ○ | ○ |

*The surface resistance value is too large for securing an electromagnetic wave shielding effect.

EXAMPLE 3

Hot galvanized sheet materials having a same amount of applied zinc of 120 g/m² but varied Ra were subjected to continuous chemical treatment and coating by continuous coil coating equipment, and wound up in the form of coil. The chemical treatment was made with a chromate so that the amount of chromium was 30 mg/m² One surface of each of the steel sheets was coated with a solvent-based melamine-alkyd clear coating at varied film thicknesses, while the other surface was made as a decorative surface which was coated with a coating material selected from three kinds of solvent-based polyester coatings, namely a silver metallic polyester coating (specular gloss at 60°: 50%; dry film thickness: 20 μm), a brown metallic polyester coating (specular gloss at 60°: 50%; dry film thickness: 18 μm), and a white polyester coating (specular gloss at 60°: 70%; dry film thickness: 20 μm).

Table 2 shows the Ra of the steel sheet material, the dry film thicknesses of the melamine-alkyd clear coating, the results of measurement of the electrical conductivity, and the test results on blocking and corrosion resistance.

The methods of measurements of the Ra of the steel sheet material and the dry thickness of the coating, the method of measuring electrical conductivity as well as the test method of corrosion resistance were the same as those of Example 1. Blocking was evaluated by the procedure of allowing a wound coil to stand for 1 week, unwinding the coil, and rating the gloss unevenness appearing on the decorative surface. The ratings were same as those of Example 1.

TABLE 2

| Surface roughness Ra (μm) | Dry thickness (μm) | Overall rating | Surface resistance (mΩ) | Corrosion resistance | Blocking | Color of coating film of decorative surface | Proportion of film thickness relative to Ra (%) |
|---|---|---|---|---|---|---|---|
| 0.2 | 0.11 | ○ | 62 | ○~Δ | ○ | silver metallic | 55 |
| | 0.21 | ○ | 129 | ○ | ○ | white | 105 |
| | 0.30 | x | ∞ | ○ | ○ | brown metallic | 150 |
| | 0.42 | x | ∞ | ○ | ○ | brown metallic | 210 |
| 0.5 | 0.13 | ○ | 59 | ○~Δ | ○ | brown metallic | 26 |
| | 0.42 | ○ | 105 | ○ | ○ | white | 84 |
| | 0.51 | ○ | 118 | ○ | ○ | white | 102 |
| | 0.79 | x | ∞ | ○ | ○ | silver metallic | 158 |
| 0.8 | 0.07 | x | 55 | Δ | x | white | 9 |
| | 0.31 | ○ | 67 | ○ | ○ | silver metallic | 39 |
| | 0.77 | ○ | 92 | ○ | ○ | brown metallic | 96 |
| | 0.98 | x | ∞ | ○ | ○ | silver metallic | 123 |
| 1.0 | 0.09 | x | 36 | Δ~x | x | silver metallic | 9 |
| | 0.45 | ○ | 57 | ○~Δ | ○ | brown metallic | 45 |
| | 0.81 | ○ | 78 | ○ | ○ | brown metallic | 81 |
| | 1.07 | ○ | 148 | ○ | ○ | silver metallic | 107 |
| | 1.23 | x | ∞ | ○ | ○ | white | 123 |
| 1.5 | 0.13 | x | 35 | Δ~x | x | brown metallic | 9 |
| | 0.43 | ○ | 62 | ○~Δ | ○ | silver metallic | 29 |
| | 0.85 | ○ | 70 | ○~Δ | ○ | white | 57 |
| | 1.35 | ○ | 92 | ○ | ○ | white | 90 |
| | 2.15 | x | ∞ | ○ | ○ | brown metallic | 143 |
| 2.0 | 0.15 | x | 34 | Δ~x | x | silver metallic | 8 |
| | 0.41 | Δ | 43 | Δ | Δ | white | 21 |
| | 0.82 | Δ | 52 | ○~Δ | Δ | white | 41 |
| | 1.42 | ○ | 83 | ○ | ○ | silver metallic | 71 |

TABLE 2-continued

| Surface roughness Ra (μm) | Dry thickness (μm) | Overall rating | Surface resistance (mΩ) | Corrosion resistance | Blocking | Color of coating film of decorative surface | Proportion of film thickness relative to Ra (%) |
|---|---|---|---|---|---|---|---|
| | 2.56 | o | ∞ | o | o | brown metallic | 128 |
| 2.2 | 0.17 | x | 34 | Δ~x | x | silver metallic | 8 |
| | 0.40 | x | 39 | Δ | x | brown metallic | 18 |
| | 0.88 | x | 51 | o~Δ | Δ | white | 40 |
| | 1.59 | Δ | 82 | o | Δ | white | 72 |
| | 2.92 | x | ∞ | o | o | silver metallic | 133 |

EXAMPLE 4

Test pieces were prepared from hot galvanized steel plate materials (Ra: 0.8 μm) having an amount of zinc of 120 g/m$^2$ applied thereto, by subjecting the same to chemical treatment with chromate (amount of applied chromium: 30 mg/m$^2$), chemical treatment with zinc phosphate (amount of applied zinc phosphate: 0.2 g/m$^2$) and no chemical treatment. The test pieces were each coated with a solvent-based melamine-alkyd coating at a film thickness of 0.4 μm or 0.8 μm by a roll coater.

The results of measurement of electrical conductivity as well as test results on blocking and corrosion resistance are shown in Table 3.

The methods of measurement and tests were the same as those of Example 1.

TABLE 3

| Kind of chemical treatent | Dry thickness of coating film (μ) | Electric conductivity (value of surface resistance) (mΩ) | Blocking | Corrosion resistance |
|---|---|---|---|---|
| chromate | 0.4 | 56 | o | o |
| chromate | 0.8 | 90 | o | o |
| zinc phosphate | 0.4 | 86 | o~Δ | o~Δ |
| zinc phosphate | 0.8 | 290 | o | o |
| untreated | 0.4 | 23 | o | Δ |
| untreated | 0.8 | 61 | o | Δ |

EXAMPLE 5

Test pieces were respectively prepared from cold-rolled steel sheet materials (Ra: 0.4 μm) by subjecting the same to chemical treatment with chromate (amount of applied chromium: 30 mg/m$^2$), chemical treatment with zinc phosphate (amount of application: 0.2 g/m$^2$) and no chemical treatment. The test pieces were each coated with a solvent-based melamine-alkyd coating at a film thickness of 0.2 μm and 0.4 μm by a roll coater, respectively.

The results of measurement of electrical conductivity as well as test results on blocking and corrosion resistance are shown in Table 4.

The method of measurement of electrical conductivity and that of blocking test were the same as those of Example 1.

The corrosion resistance was evaluated in terms of the following rate of appearance of rust on the surface of the test piece which had been allowed to stand in an atmosphere having a temperature of 49°±1° C. and a relative humidity of 95% or more for 100 hours:

o the rate of appearance of rust is less than 10%,
o~Δ the rate of appearance of rust is 10 to 33%,
Δ the rate of appearance of rust is 33 to 50%,
Δ~x the rate of appearance of rust is 50 to 70%, and
x the rate of appearance of rust is more than 70%.

TABLE 4

| Kind of chemical treatment | Dry thickness of coating film (μ) | Electric conductivity (value of surface resistance (mΩ) | Blocking | Corrosion resistance |
|---|---|---|---|---|
| chromate | 0.2 | 61 | o | o |
| chromate | 0.4 | 96 | o | o |
| iron phosphate | 0.2 | 110 | o~Δ | o~Δ |
| iron phosphate | 0.4 | 310 | o | o |
| untreated | 0.2 | 27 | o | Δ |
| untreated | 0.4 | 66 | o | Δ |

EXAMPLE 6

Test pieces were prepared from a 55% Al—Zn plated steel sheet (amount of plating: 244 g/m$^2$), a Fe—Zn plated steel sheet (amount of plating: 90 g/m$^2$), an electrogalvanized sheet (amount of zinc: 40 g/m$^2$), a stainless steel sheet (SUS 304) and a tin free steel sheet (TFS). One group of these steel sheets was subjected to chemical treatment with chromate to such extent that they were coated with chromium of 30 mg/m$^2$, while the other group was not subjected to chemical treatment. As regards the chemically treated sheets, they were coated with solvent-based polyester coating material by a roll coater.

The results of measurement of electric conductivity, test of blocking and test of corrosion resistance are shown in Table 5.

The method of measuring the electric conductivity and the method of testing the blocking were same as those of Example 1. The method of testing the corrosion resistance was same as that of Example 1 (JIS Z 2371), and the evaluation was made by the rate of appearance of rust on the surface of the test piece. The ratings were as follows:

o the rate of appearance of rust is less than 10%,
o~Δthe rate of appearance of rust is 10 to 33%,
Δ the rate of appearance of rust is 33 to 50%,
Δ~x the rate of appearance of rust is 50 to 70%, and
x the rate of appearance of rust is more than 70%.

TABLE 5

| Kind | Surface roughness Ra (μm) | Dry thickness (μm) | Overall rating | Surface resistance (mΩ) | Corrosion resistance | Blocking | Proportion of film thickness relative to Ra (%) |
|---|---|---|---|---|---|---|---|
| 55% Al—Zn | 0.5 | 0 | Δ | 11 | o~Δ | x | 0 |

TABLE 5-continued

| Kind | Surface roughness Ra (μm) | Dry thickness (μm) | Overall rating | Surface resistance (mΩ) | Corrosion resistance | Blocking | Proportion of film thickness relative to Ra (%) |
|---|---|---|---|---|---|---|---|
| plated | | 0.4 | ∘ | 48 | ∘ | ∘ | 80 |
| sheet | 2.0 | 0 | Δ | 9 | ∘~Δ | x | 0 |
| | | 1.6 | ∘ | 74 | ∘ | ∘ | 80 |
| Fe—Zn | | 0 | x | 22 | Δ~x | x | 0 |
| plated | 0.6 | 0.3 | ∘ | 71 | ∘ | ∘ | 50 |
| sheet | | 0 | x | 19 | Δ~x | x | 0 |
| | 1.5 | 1.3 | ∘ | 94 | ∘ | ∘ | 87 |
| Electro- | 0.3 | 0 | x | 14 | x | x | 0 |
| galvanized | | 0.1 | ∘ | 61 | ∘~Δ | ∘ | 33 |
| sheet | 1.3 | 0 | x | 12 | x | x | 0 |
| | | 1.0 | ∘ | 76 | ∘ | ∘ | 77 |
| Stainless | 0.6 | 0 | Δ | 29 | ∘ | x | 0 |
| steel | | 0.3 | ∘ | 102 | ∘ | ∘ | 50 |
| | 1.7 | 0 | Δ | 25 | ∘ | x | 0 |
| | | 1.2 | ∘ | 127 | ∘ | ∘ | 71 |
| TFS | 0.2 | 0 | x | 13 | x | x | 0 |
| | | 0.1 | ∘ | 78 | ∘ | ∘ | 50 |
| | 1.0 | 0 | x | 11 | x | x | 0 |
| | | 0.7 | ∘ | 81 | ∘ | ∘ | 70 |

What is claimed is:

1. A conductive and corrosion-resistant steel sheet comprising a steel sheet material having an arithmetic average surface roughness (Ra) of 0.01 to 2.0 μm, and a coating film applied thereon and having a thickness of 18 to 110% of said Ra, said coating film having been applied to said steel sheet material by a roll coater to form very thin film parts or partially exposed parts on tops of protruded portions of the surface of said steel sheet which allow an electric current to flow therethrough, while providing corrosion resistant properties to the steel sheet, wherein said coating film contains a coating material selected form the group consisting of a melamine-alkyd resin, a polyester resin, a polyvinylidene fluoride resin, an acrylic resin, a silicone-polyester resin, an epoxy resin and a urethane resin.

2. A conductive and corrosion-resistant steel sheet according to claim 1, wherein the arithmetic average surface roughness (Ra) is 0.2 to 1.5 μm.

3. A conductive and corrosion-resistant steel sheet according to claim 1, wherein the coating film applied on the steel sheet has a thickness of 30 to 90% of said Ra.

4. A conductive and corrosion-resistant steel sheet comprising a steel sheet material having an arithmetic average surface roughness (Ra) of 0.01 to 2.0 μm, a coating film applied thereon and having a thickness of 18 to 110% of said Ra, and a chemical conversion treatment layer selected form the group consisting of a chromate layer, a zinc phosphate layer and an iron phosphate layer applied between said steel sheet material and said coating film, said coating film having been applied to said steel sheet by a roll coater to form very thin film parts or partially exposed parts on tops of protruded portions of the surface of said steel sheet which allow an electric current to flow therethrough, while providing corrosion resistant properties to the steel sheet.

5. A conductive and corrosion-resistant steel sheet according to claim 4, wherein the arithmetic average surface roughness (Ra) is 0.2 to 1.5 μm.

6. A conductive and corrosion-resistant steel sheet according to claim 4, wherein the coating film applied on the steel sheet has a thickness of 30 to 90% of said Ra.

7. A conductive and corrosion-resistant steel sheet according to claim 4, wherein the chemical conversion treatment layer is a chromate layer.

8. A conductive and corrosion-resistant steel sheet according to claim 4, wherein the chemical conversion treatment layer is a zinc phosphate layer.

9. A conductive and corrosion-resistant steel sheet according to claim 4, wherein the chemical conversion treatment layer is an iron phosphate layer.

10. A coating according to claim 4, in which the coating film contains a coating material selected from the group consisting of a melamine-alkyd resin, a polyester resin, a polyvinylidene fluoride resin, an acrylic resin, a silicone-polyester resin, an epoxy resin and a urethane resin.

11. A conductive and corrosion-resistant steel sheet comprising a steel sheet material having an arithmetic average surface roughness (RA) of 0.01 to 2.0 μm, and a coating film applied thereon and having a thickness of 18 to 110% of said Ra, said coating film being made of a material selected from the group consisting of a melamine-alkyd resin, a polyester resin, a silicone-polyester resin, an epoxy resin and a urethane resin and containing metallic particles in said material, said coating film providing corrosion-resistant properties and electrical conductivity such that current may pass from a surface of said steel sheet material therethrough.

12. A coating according to claim 11 in which the coating material is a polyester coating containing metallic particles therein.

13. A conductive and corrosion-resistant steel sheet comprising a steel sheet material having an arithmetic average surface roughness (RA) of 0.01 to 2.0 μm, a coating film applied thereon and having a thickness of 18 to 110% of said Ra, and a chemical conversion treatment layer applied between said steel sheet material and said coating film, said coating film being made of a material selected from the group consisting of a melamine-alkyd resin, a polyester resin, an epoxy resin and a urethane resin and containing metallic particles in said material, said coating film providing corrosion-resistant properties and electrical conductivity such that current may pass from a surface of said steel sheet material and a said chemical conversion treatment layer through the coating material.

14. A coating according to claim 13 in which the coating material is a polyester coating containing metallic particles therein.

15. A conductive and corrosion-resistant steel sheet comprising a steel sheet material having an arithmetic average surface roughness (Ra) of 0.01 to 2.0 μm, a coating film applied thereon and having a thickness of 18 to 110% of said Ra, and a chemical conversion treatment layer applied between said steel sheet material and said coating film, said coating film having been applied to said steel sheet by a roll coater to form very thin film parts or partially exposed parts on tops of protruded portions of the surface of said steel sheet which allow an electric current to flow therethrough, while providing corrosion resistant properties to the steel sheet, wherein said coating film contains a coating material selected from the group consisting of a melamine-alkyd resin, a polyester resin, a polyvinylidene fluoride resin, an acrylic resin, a silicone-polyester resin, an epoxy resin and a urethane resin.

* * * * *